US009759603B2

(12) United States Patent
Kanzawa et al.

(10) Patent No.: US 9,759,603 B2
(45) Date of Patent: Sep. 12, 2017

(54) PHOTOMETRIC APPARATUS

(71) Applicant: Sekonic Corporation, Tokyo (JP)

(72) Inventors: Tomohide Kanzawa, Tokyo (JP); Hiroshi Harada, Tokyo (JP); Yasushi Fukazawa, Tokyo (JP); Eigo Yoshikawa, Tokyo (JP); Hirohiko Okabe, Tokyo (JP)

(73) Assignee: SEKONIC CORPORATION, Tokyo (JP)

( * ) Notice: Subject to any disclaimer, the term of this patent is extended or adjusted under 35 U.S.C. 154(b) by 0 days.

(21) Appl. No.: 14/843,310

(22) Filed: Sep. 2, 2015

(65) Prior Publication Data

US 2016/0231174 A1    Aug. 11, 2016

(30) Foreign Application Priority Data

Sep. 4, 2014  (JP) ................. 2014-180371

(51) Int. Cl.
*G01N 21/25* (2006.01)
*G01J 3/02* (2006.01)
*G01J 1/04* (2006.01)
*G01J 1/02* (2006.01)
*G01J 3/46* (2006.01)

(52) U.S. Cl.
CPC ........... *G01J 3/0272* (2013.01); *G01J 1/0233* (2013.01); *G01J 1/0403* (2013.01); *G01J 1/0411* (2013.01); *G01J 1/0418* (2013.01); *G01J 1/0422* (2013.01); *G01J 1/0448* (2013.01); *G01J 1/0474* (2013.01); *G01J 3/0202* (2013.01); *G01J 3/0205* (2013.01); *G01J 3/0208* (2013.01); *G01J 3/0213* (2013.01); *G01J 3/0216* (2013.01); *G01J 3/0237* (2013.01); *G01J 3/46* (2013.01)

(58) Field of Classification Search
CPC ........ G01J 3/02; G01J 3/50; G01J 3/51; G01J 9/00; G01N 21/255
See application file for complete search history.

(56) References Cited

U.S. PATENT DOCUMENTS

2007/0272844 A1* 11/2007 Dominic ................ G01J 3/08
250/239

FOREIGN PATENT DOCUMENTS

| JP | 2006-189291 | 7/2006 |
|---|---|---|
| JP | 2009-053063 | 3/2009 |
| JP | 2010-133833 | 6/2010 |

* cited by examiner

*Primary Examiner* — Abdullahi Nur
(74) *Attorney, Agent, or Firm* — Young & Thompson

(57) ABSTRACT

This is to provide a photometric apparatus improved in measurement precision by improving the state of light incident to a sensor, which photometric apparatus 1 comprises a photometric sensor 30 into which light which is an object to be measured is incident, a signal processing means for processing a sensor output by the photometric sensor, and optical systems 50, 100, 92, 93 and 150 which introduces external light into the photometric sensor, wherein a columnar fiber rod 100 in which a center axis is provided along a direction perpendicular to a light receiving surface of the photometric sensor is provided at a part of the optical system.

6 Claims, 14 Drawing Sheets

PHOTOMETRIC APPARATUS

TECHNICAL FIELD

The present invention relates to a photometric apparatus such as a color meter, etc., for measuring chromaticity or illuminance, etc., of light to be measured, in particular, relates to an apparatus improved in measurement precision by improving the state of light incident to a sensor.

BACKGROUND ART

A color meter (a color measuring instrument, a color temperature measuring instrument) is a photometric apparatus which is to carry out photometry using a plural number of sensors having different spectral sensitivity characteristics, and a color temperature, etc., of light which is an object to be measured is calculated.

For example, in Patent Document 1, there is disclosed a color meter which outputs information concerning a color temperature, etc., corresponding to three-color spectral sensitivities having different characteristics to each other by using four sets of photometric sensors having different spectral sensitivities to each other.

In Patent Documents 2 and 3, there is also disclosed a photometric apparatus (an illuminance spectrometer) in which light which is an object to be measured is successively passed through a slit and a collimating lens, and then, entered into a light receiving sensor.

PRIOR ART DOCUMENTS

Patent Documents

Patent Document 1: JP 2009-053063A
Patent Document 2: JP 2010-133833A
Patent Document 3: JP 2006-189291A

SUMMARY OF THE INVENTION

Problems to be Solved by the Invention

For example, when a spectroscopic sensor in which spectral sensitivity characteristics of a plural number of photometric elements have been changed by a linear variable filter which is capable of changing the thickness continuously is used as a photometric sensor, it is necessary to make incident light as parallel light by mixing well and then collimating the same, and to be entered into a sensor.

When light is, for example, obliquely entered into a sensor, originally intended spectral sensitivity characteristics cannot be obtained, and measurement precision is worsened.

In view of the above-mentioned problems, an object of the present invention is to provide a photometric apparatus improved in measurement precision by improving the state of light entered into a sensor.

Means to Solve the Problems

The present invention solves the above-mentioned problems by the following solving means.

The invention according to Claim 1 is a photometric apparatus, which comprises a photometric sensor into which light which is an object to be measured is incident, a signal processing means for processing a sensor output by the photometric sensor, and an optical system which introduces external light into the photometric sensor, wherein a columnar fiber rod in which a center axis is provided along a direction perpendicular to a light receiving surface of the photometric sensor is provided at a part of the optical system.

According to this constitution, the external light which is an object to be measured is subjected to mixing in the fiber rod, adjustment to make it parallel light becomes easy, whereby the state of the light incident to the sensor can be improved so that measurement precision can be improved.

Here, a shape of the fiber rod may be, for example, columnar, or polygonal such as quadrangular and hexagonal, etc. Also, as a material of the fiber rod, for example, a glass, quartz, a plastics, etc., may be employed. Further, a structure of the fiber rod may be a fiber structure or a uniform structure.

The invention according to Claim 2 is the photometric apparatus defined in Claim 1, wherein a length of the fiber rod is made 5-fold or more of the diameter or the distance between two opposite sides thereof.

According to this constitution, it is possible to totally reflect lights which are incident with a relatively small inclined angle, whereby improved effect of the state of light can be heightened.

Here, when the fiber rod has a columnar shape, it is preferred to make its length 5-fold or more to that of the diameter, and when it has a prismatic shape, it is preferred to make the same 5-fold or more to the distance between two opposite sides.

The invention according to Claim 3 is the photometric apparatus defined in Claim 1 or Claim 2, wherein the apparatus is provided by a diffusion board which diffuses external light entered into the fiber rod, and a collimating optical element which makes light emitted from the fiber rod substantially parallel light.

According to this constitution, the above-mentioned effects can be certainly obtained.

The invention according to Claim 4 is the photometric apparatus defined in Claim 3, wherein a diaphragm plate to cut off stray light is provided between the collimating optical element and the photometric sensor.

According to this constitution, the above-mentioned effects can be more heightened by reducing stray light.

The invention according to Claim 5 is the photometric apparatus defined in any one of Claim 1 to Claim 4, wherein at least one of an IR cut-off filter and a heat absorption filter is provided to at least one of an incident side and an emitting side of the fiber rod.

According to this constitution, the above-mentioned effects can be further heightened by reducing stray light such as infrared rays, etc.

Effects of the Invention

As explained above, according to the present invention, a photometric apparatus improved in measurement precision by improving the state of light incident to a sensor can be provided.

BEST MODE TO CARRY OUT THE INVENTION

The present invention has solved the problem that is to provide a photometric apparatus improved in measurement precision by improving the state of light incident to a sensor, by providing a fiber rod having a function of mixing light at a part of an optical system introducing the light into the sensor.

EXAMPLES

In the following, a color meter (a colorimetric device) which is an Example of the photometric apparatus to which the present invention has been applied is explained.

Figure 1:
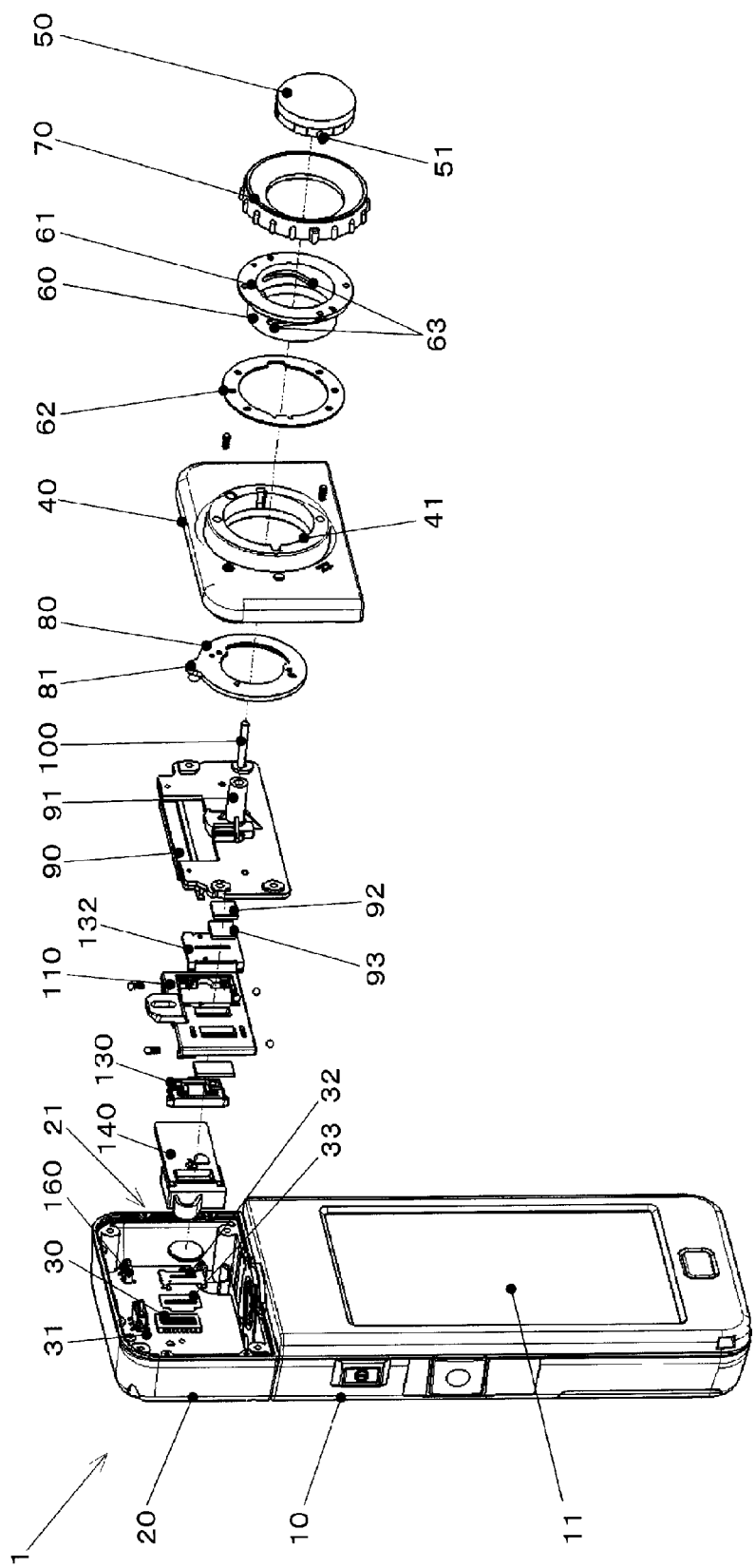
FIG. 1 is an exploded perspective view of a color meter which is an example of the photometric apparatus to which the present invention has been applied.

FIG. 1 is an exploded perspective view of a color meter of Example.

The color meter 1 is constituted by possessing a body portion 10, a sensor housing portion 20, a spectroscopic sensor 30, an optical cover 40, a light bulb 50, a cam case 60, an operating member 70, a lens pressing member 80, a filter fixing member 90, a fiber rod 100, an optical sliding member 110, an ND filter 120, a movable light shielding member 130, a fixed light shielding member 140, a collimating lens 150, a filter position detecting sensor 160, etc.

Incidentally, in the following explanation, the terms "optical axis" are to show a center axis of the fiber rod 100.

The body portion 10 is constituted by containing an information processing apparatus such as CPU which processes an output of a spectroscopic sensor 20, a storage apparatus such as RAM and ROM, etc., an input/output interface, a power source and a bus connecting these, etc., in a cabinet made of a resin.

At the front portion (at the surface portion at the light source side at the time of photometry) of the body portion 10, an image display apparatus 11 such as an LCD, etc., has been provided.

This image display apparatus 11 can be made the constitution also acts as an operating member by making it, for example, a touch panel.

The sensor housing portion 20 is a cabinet portion into which a spectroscopic sensor 30, etc., is/are contained.

The sensor housing portion 20 is a box shaped member provided at one end (for example, an upper portion at the time of usual use) of the body portion 10, and an opening 21 opened at the light source side is formed.

The sensor housing portion 20 is so attached to the body portion 10 that it is rotatable around an orthogonal axis of the optical axis.

The sensor housing portion 20 is, for example, integrally formed by an injection molding of a resin-based material.

The spectroscopic sensor 30 is a photometric sensor in which a linear variable filter (LVF) to which one direction wedge-like coating a thickness of which is continuously changed has been applied is provided at an incident side of a CMOS sensor on which a plural number (for example, 128 elements) of photometric elements have been arranged.

According to such a constitution, the respective photometric elements of the spectroscopic sensor 30 have substantially different spectral sensitivity characteristics continuously.

Outputs of the spectroscopic sensor 30 are transmitted to an information processing apparatus and subjected to arithmetic operation, whereby various kinds of information such as chromaticity, color temperature, illuminance, etc., are calculated.

The spectroscopic sensor 30 is fixed at the center portion of a wall surface (a wall surface at the side far from the light source) at the opposite side to an opening 21 of the sensor housing portion 20, through a substrate 31.

The substrate 31 is a flat plate-shaped member arranged along the direction perpendicular to the optical axis.

At the light source side of the spectroscopic sensor 30, light shielding plates 32 and 33 to which a slit is formed to a thin plate for shielding stray light are successively arranged from the light source side.

The optical cover 40 is a lid-like member closing an opening 21 of the sensor housing portion 20, and an opening 41 through which an optical path of a photometric optical system is formed at the center portion thereof.

The optical cover 40 is, for example, integrally formed by an injection molding of a resin-based material.

The optical cover 40 acts as a base portion by which a light bulb 50, a cam case 60, an operating member 70, a lens pressing member 80, a fiber fixing member 90, etc., are supported, and also various kinds of indexes (display) to be used for selection of operating modes are formed on the surface thereof.

With regard to these points, explanation is made in detail in the following.

The light bulb 50 is formed by a semi-transparent milky white resin-based material, and is a diffusion board to diffuse incident light.

The light bulb 50 has a spherical convex portion extended to the light source side.

The light bulb 50 is freely movable along the optical axis direction between a photometric position which is projected from the operating member 70 to the light source side, and a retracting position which is substantially drawn to the spectroscopic sensor 30 side than the operating member 70 by a cam groove 63 formed at a cam case 60.

To the light bulb 50 is provided a pin-like cam follower 51 (see FIG. 3) to be inserted into a cam groove 63.

The cam follower 51 is so formed that it is projected from the outer peripheral portion of a light bulb 50 to an outer diameter side.

The cam case 60 is a cylindrical shaped member formed substantially concentrically with the optical axis, is inserted into an opening 41 of an optical cover 40, and is rotatably supported around a center axis to the optical cover 40.

The cam case 60 is, for example, integrally formed by an injection molding of a resin-based material.

At the side surface portion (peripheral surface portion) of the cam case 60, a cam groove 63 (see FIG. 3, etc.) which drives a light bulb 50 to the optical axis direction is formed.

The cam case 60 rotates with an operating member 70 when a user rotates the operating member 70 around the optical axis to the optical cover 40.

At the edge portion of the light source side of the cam case 60, a flange 61 extended to an outer diameter side in a collar state is formed.

Between the flange 61 and the peripheral portion of the opening 41 of the optical cover 40, a click plate 62 which is a member to generate click feeling at the time of rotating the cam case 60 is provided.

The click plate 62 has functions to perceive a user when the user switched the operation mode by rotating the operating member 70, and to retain the state that the operating member 70 and the cam case 60 do not generate an unintentional rotation.

Figure 7:
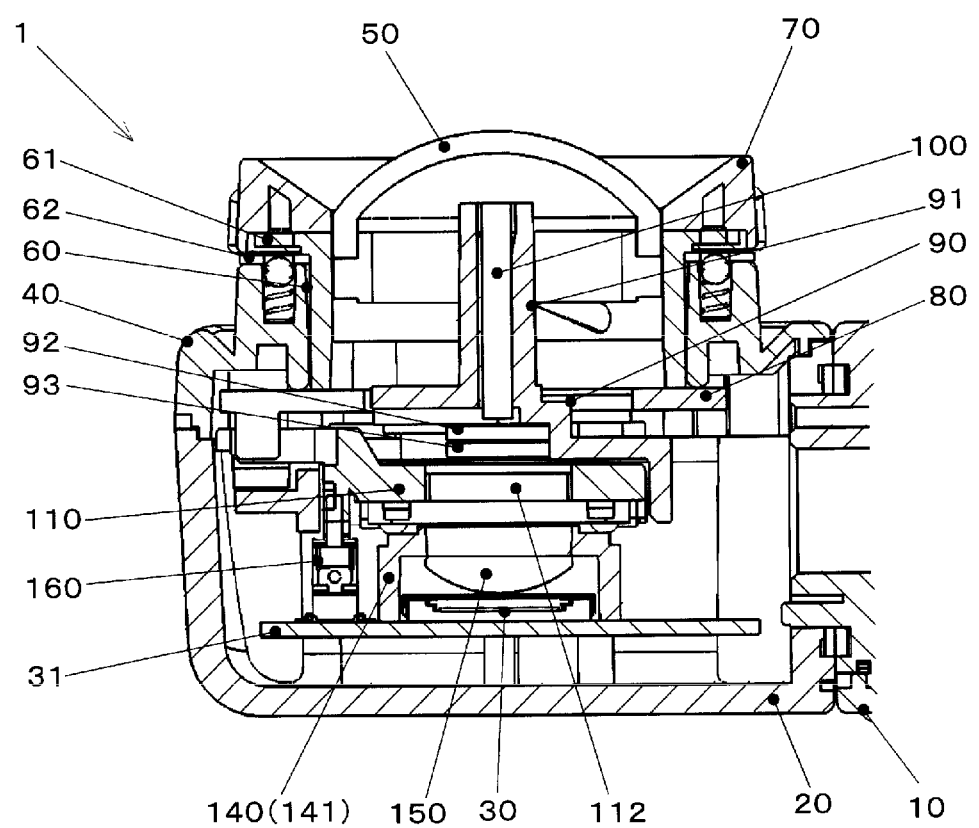
FIG. 7 is a sectional drawing viewing from the arrow direction at the VII-VII portion of FIG. 4.

The click plate 62 has, as shown in FIG. 7, a hole portion which is provided at the optical cover 40 and engages with steel balls which are energized by a spring.

The operating member 70 is a member into which a user inputs an operation selecting operation modes (each photometry mode and calibration mode) of a color meter 1.

The operating member 70 is, for example, integrally formed by an injection molding of a resin-based material.

Operation modes of the color meter 1 have an H mode (high light quantity mode), an L mode (low light quantity mode) and a D mode (dark calibration mode), and the operating member 70 is to carry out a selection operation of these modes by a user.

The L mode is a photometry mode (usual photometry mode) to be used, for example, in a usual stationary light photometry, etc.

The H mode is a photometry mode (large light quantity photometry mode) to be used, for example, in a photometry of a light source with a larger light quantity than the photometry in the L mode such as flash light generated by a flash light emitting device for photographing.

The D mode is a mode in which an output of the spectroscopic sensor 30 is obtained as a dark state where incident of light into the spectroscopic sensor 30 is substantially shielded, and calibration (dark calibration) of the color meter 1 is carried out.

Incidentally, the D mode can be selected at the time where the power source is turn off and the color meter 1 is stored during nonuse of the color meter 1.

The operating member 70 is formed in an annular shape which is substantially concentrically with the optical axis, and provided at an outer diameter side of the light bulb 50 and at a peripheral portion of the opening 41 of the optical cover 40.

The operating member 70 is so supported to the optical cover 40 that it is rotatable around the optical axis.

The operating member 70 is connected to the cam case 60, and a rotation of the operating member 70 is adapted to be transmitted to the cam case 60.

Figure 2:
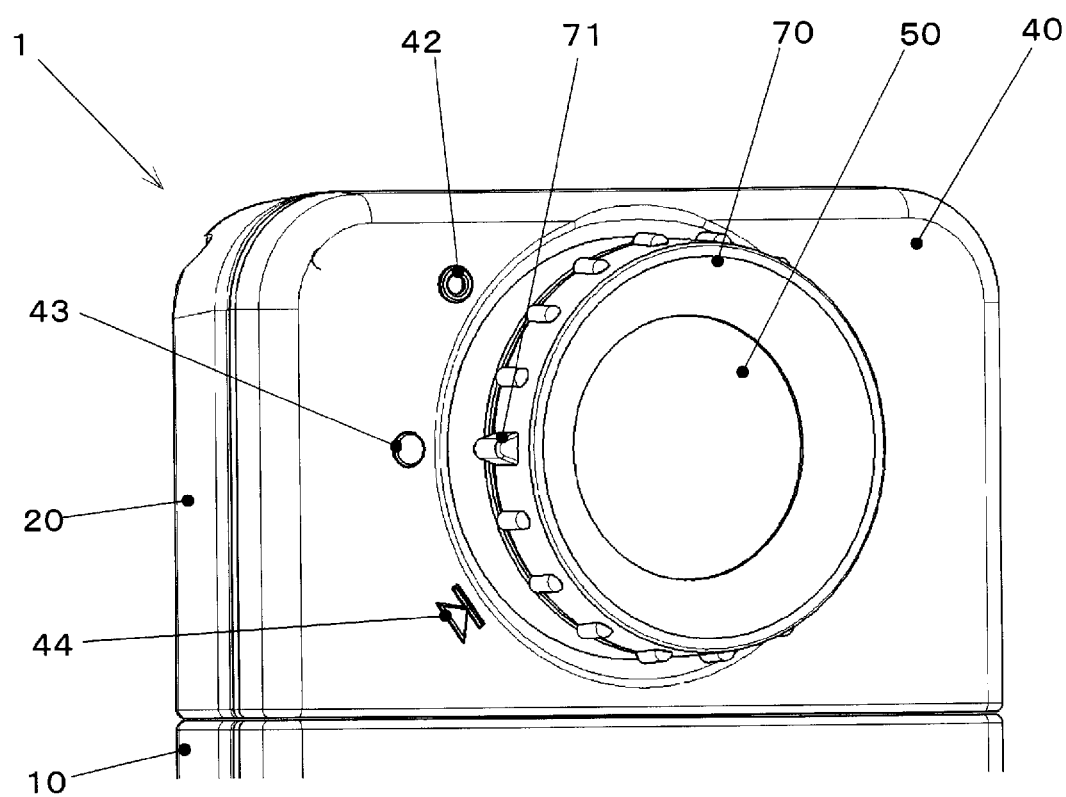
FIG. 2 is an external perspective view of a peripheral portion of an operating member in a color meter of Example.

FIG. 2 is an external perspective view of a peripheral portion of an operating member in a color meter of Example.

FIG. 2 shows the state in an L mode.

An index 71 is formed at the operating member 70.

The index 71 is so formed that it is projected to an outer diameter side from a portion in the outer peripheral portion of the operating member 70.

On the other hand, at the peripheral portion of the opening 41 of the optical cover 40, the H mode index 42, the L mode index 43 and the D mode index 44 are arranged in the circumferential direction.

The user is to be carried out an operation of selecting operation modes by rotating the operating member 70 around the optical axis, and adapting the index 71 to an optional index at the optical cover 40 side.

For example, in FIG. 2, it is shown the state where the L mode is selected, and by rotating the operating member clockwise from the portion, switching to the H mode is carried out, while by rotating the same counter clockwise, switching to the D mode is to be carried out.

Figure 3:
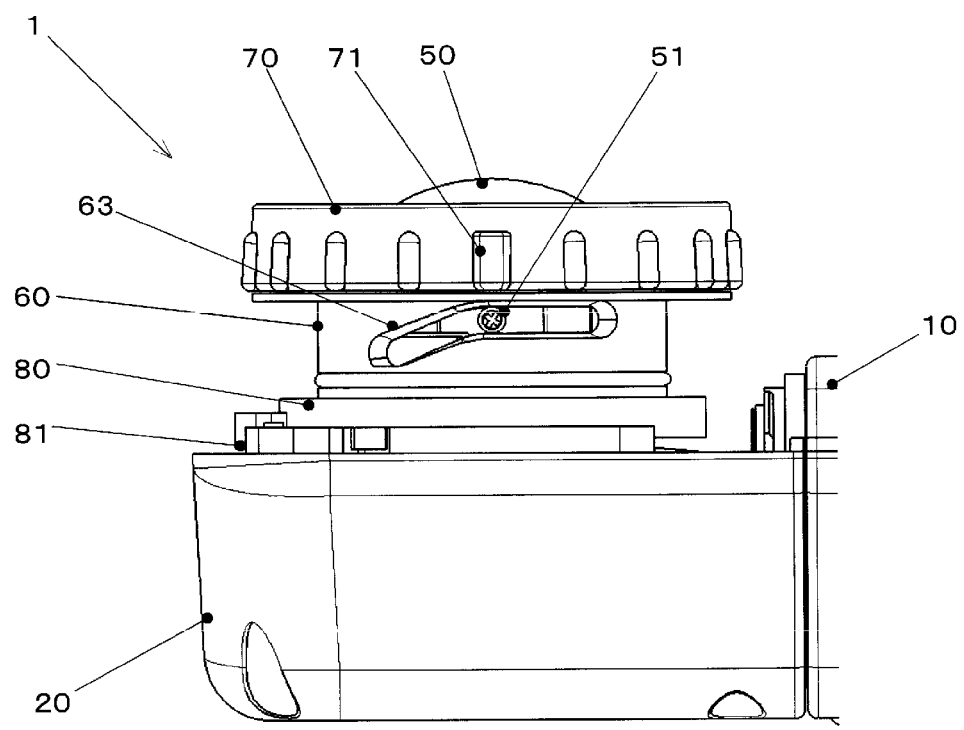
FIG. 3 is a drawing showing a constitution of a cam mechanism in a color meter of Example.

FIG. 3 is a drawing showing the constitution of a cam mechanism in a color meter of Example.

FIG. 3 shows the state in which the cam case 60 is viewed from the radial direction, and the optical cover 40 is not shown in the drawing.

FIG. 3 shows the state of an L mode.

A cam follower 51 of the light bulb 50 is inserted into the cam groove 63 formed at the peripheral surface of the cam case 60.

The cam groove 63 and the cam follower 51 are relatively displaced depending on the rotation of the cam case 60 to change the position of the light bulb 50 in the optical axis direction.

The cam groove 63 is so formed that it pulls the light bulb 50 in the spectroscopic sensor 30 side along the optical axis direction at the time of transition from the L mode to the D mode (the cam case 60 rotates counter clockwise in view of the light source side), and it maintains the state that the light bulb 50 is extended at the time of transition from the L mode to the H mode (the cam case 60 rotates clockwise in view of the light source side).

The lens pressing member 80 is a substantially annular shaped member, which is attached to an end of the spectroscopic sensor 30 side of the cam case 60.

The lens pressing member 80 is, for example, integrally formed by an injection molding of a resin-based material.

The lens pressing member 80 is provided at the inside of the optical cover 40 at the peripheral portion of the opening 41 of the optical cover 40, and is intended to retain the cam case 60 so as not to fall it from the optical cover 40.

The lens pressing member 80 is so formed that it is extended in a collar state from the cam case 60 to an outer diameter side, and the face portion of the light source side is slidably contacted with an inner face of the optical cover 40.

The lens pressing member 80 has an engaging portion 81 which engages with an optical sliding member 110.

The engaging portion 81 has an engagement pin 81a which is projected from an outer peripheral portion of the lens pressing member 80 to the opposite side of the light source side.

The engagement pin 81a is a material inserted into a groove portion 113a of the optical sliding member 110, and is to relatively displace the optical sliding member 110 interlocking with the rotation of the cam case 60 relative to the sensor housing portion 20.

Figure 4:
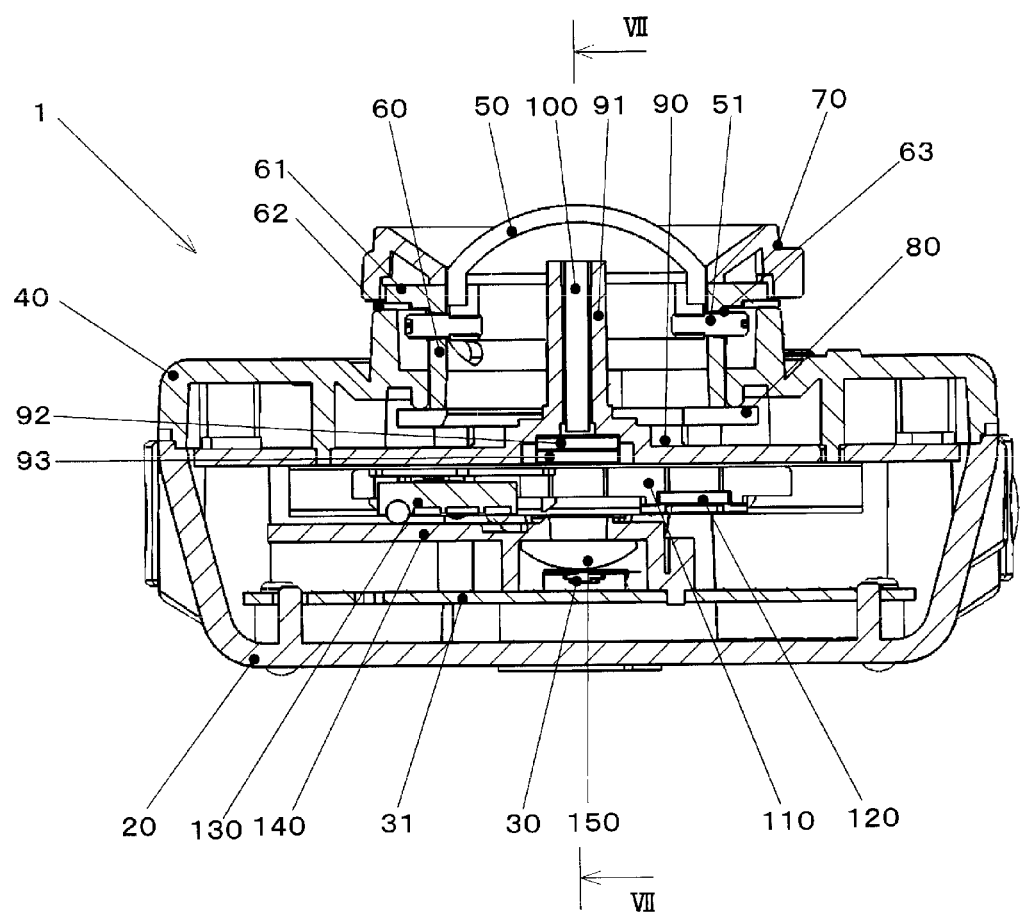
FIG. 4 is a sectional view in which a color meter of Example is cut with a plane which contains a center axis of a fiber rod and is parallel in a moving direction of an optical sliding member, and is a drawing showing an L mode state.
Figure 5:
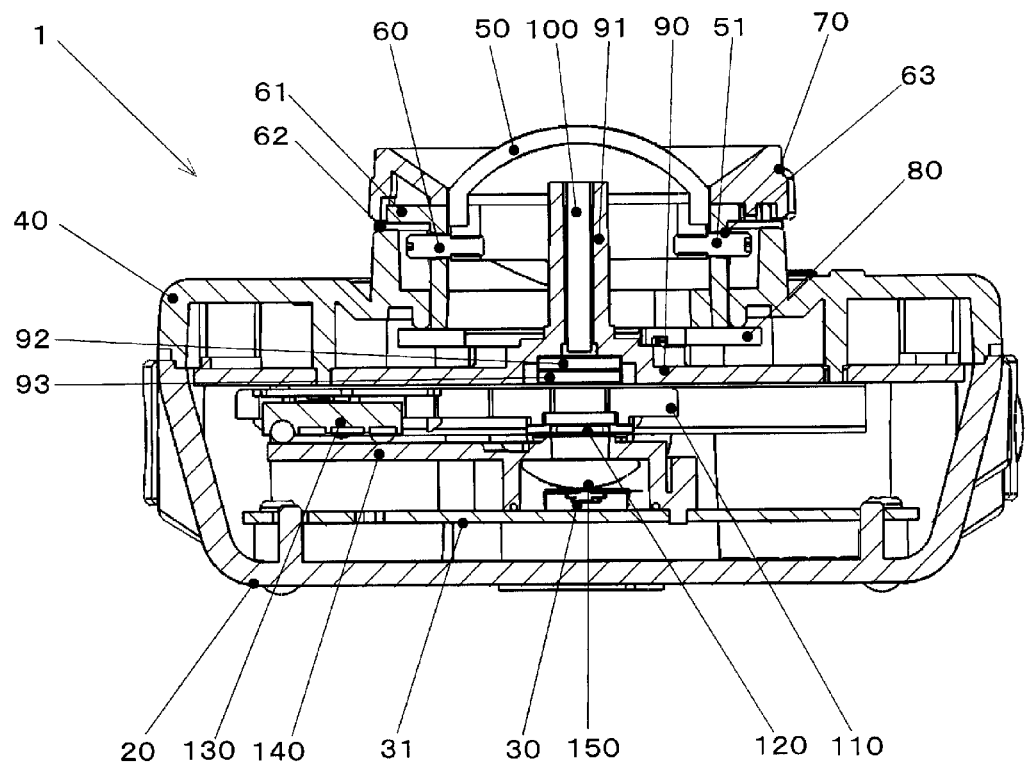
FIG. 5 is a sectional view in which a color meter of Example is cut with a plane which contains a center axis of a fiber rod and is parallel in a moving direction of an optical sliding member, and is a drawing showing an H mode state.
Figure 6:
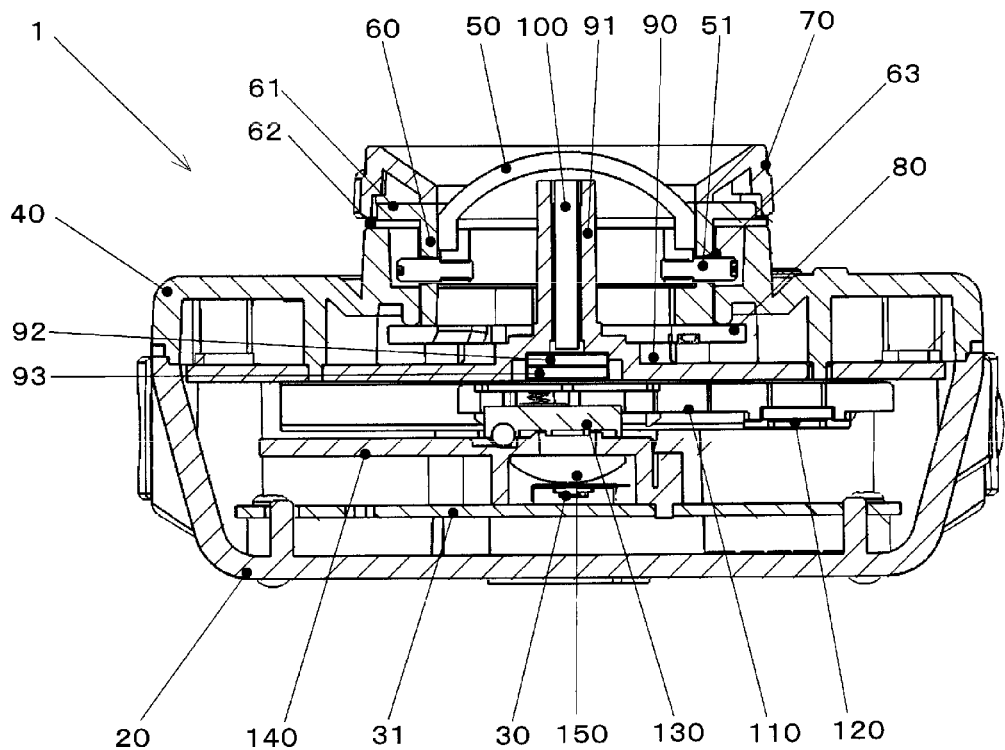
FIG. 6 is a sectional view in which a color meter of Example is cut with a plane which contains a center axis of a fiber rod and is parallel in a moving direction of an optical sliding member, and is a drawing showing a D mode state.

FIGS. 4 to 6 are sectional views in which a color meter of Example is cut with a plane which contains a center axis of a fiber rod and is parallel in a moving direction of an optical sliding member, and are drawings showing an L mode state, an H mode state and a D mode state, respectively.

FIG. 7 is a sectional drawing viewing from the arrow direction at the VII-VII portion of FIG. 4.

As shown in FIG. 4, etc., the filter fixing member 90 is arranged between the light bulb 50 and the spectroscopic sensor 30 in the optical system of the color meter 1.

The filter fixing member 90 is fixed at the optical cover 40.

The filter fixing member 90 is, for example, integrally formed by an injection molding of a resin-based material.

The filter fixing member 90 has a fiber rod holding portion 91.

The fiber rod holding portion 91 is a cylindrical portion formed by projecting from the filter fixing member 90 to the light bulb 50 side.

The fiber rod holding portion 91 is substantially concentrically arranged with the optical axis.

At the spectroscopic sensor 30 side of the filter fixing member 90, an IR cut-off filter 92 and a heat absorption filter 93 are successively provided from the light source side.

The IR cut-off filter 92 and the heat absorption filter 93 are optical elements through which light passed through the fiber rod 100 is successively passed.

The IR cut-off filter 92 is a dielectric multilayer film filter which reflects light with a wavelength of infrared region.

The heat absorption filter 93 is a filter which absorbs heat ray irradiated from the light source.

The IR cut-off filter 92 and the heat absorption filter 93 are so constituted that these do not substantially effect on the light in the visible region.

The fiber rod 100 is a transparent rod made of a plastics (PMMA) which is formed in a cylindrical shape.

The fiber rod 100 is constituted by forming a clad around a core formed by a plastics (PMMA).

The fiber rod 100 is so formed that a diameter is, for example, about 2 mm, and a length of, for example, about 15 mm.

The fiber rod 100 acts as a mixing rod which emits light entered from the light bulb 50 by mixing the same.

The light entered from an inclined direction to the light bulb 50 proceeds through an inside of the fiber rod 100 while repeating total reflection at the outer peripheral surface portion (clad inner surface).

Here, a length of the fiber rod 100 is preferably set, for example, 5-fold or more of the diameter to obtain a sufficient mixing effect.

The end position at the light bulb 50 side (an incident side) of the fiber rod 100 is, as shown in FIG. 6, so set in consideration with not to interfere with the light bulb 50 when the light bulb 50 is retracted with the D mode.

The optical sliding member 110 is arranged between the filter fixing member 90 and the fixed light shielding member 140.

The optical sliding member 110 is a member which changes the state of the incident light to the spectroscopic sensor 30 by arranging an opening, an ND filter 120 and a movable light shielding member 130 on the optical path, respectively, depending on the selecting operation of the L mode, the H mode or the D mode by the operating member 70.

Figure 8:
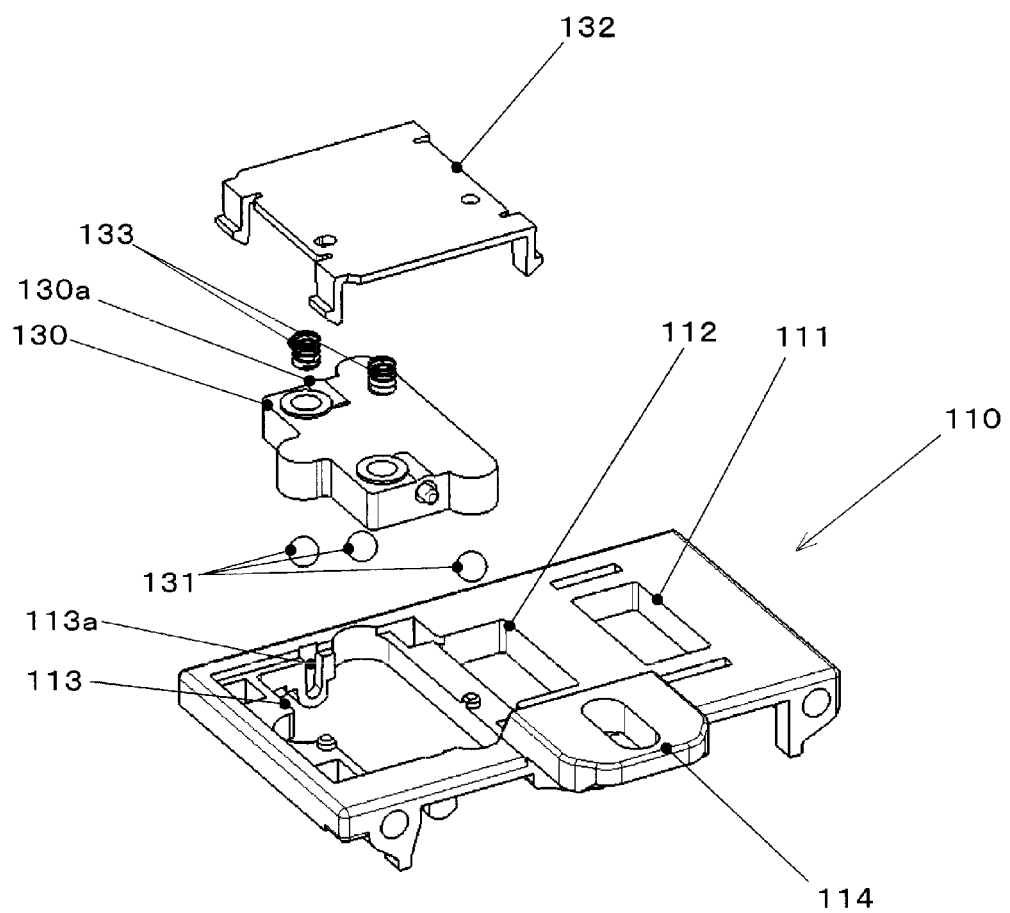
FIG. 8 is an exploded perspective view at a peripheral of an optical sliding member in a color meter of Example.

FIG. 8 is an exploded perspective view at a peripheral of an optical sliding member in a color meter of Example.

The optical sliding member 110 is formed to a rectangular plate shape which is formed along a plane surface substantially perpendicular to the optical axis.

The optical sliding member 110 is, for example, integrally formed by an injection molding of a resin-based material.

The optical sliding member 110 is so supported that it is relatively movable (slidable) to a straight direction along the lengthwise direction of the rectangular shape to the filter fixing member 90.

The optical sliding member 110 is so constituted that steel balls are embed at the side portion along the slide direction, and it is to be relatively movable to filter fixing member 90 by engaging the projected portion of the light bulb projecting from the optical sliding member 110 with the groove portion formed at the filter fixing member 90.

At the optical sliding member 110, an ND filter fitting portion 111, an opening 112 and a movable light shielding member attached portion 113 are successively arranged along with the slide direction.

The ND filter fitting portion 111 is a rectangular frame-like opening portion to which the ND filter 120 used in the H mode is to be attached.

The opening 112 is a through hole which passes the light emitted from the heat absorption filter 93 to reach to a collimating lens 150 in the L mode.

The opening 112 is formed in a rectangular frame-like shape.

The movable light shielding member attached portion 113 is an opening portion of the rectangular shape into which the movable light shielding member 130 is inserted.

Into the center portion at one of the long sides of the optical sliding member 110 is inserted the engagement pin 81a of a lens pressing member 80, and an engaged portion 114 (a portion to be engaged) which engages with the engaging portion 81 is formed.

At the engaged portion 114, a long hole extending to the direction perpendicular to the slide direction is formed, and the engagement pin 81a is inserted into this portion.

Figure 9:
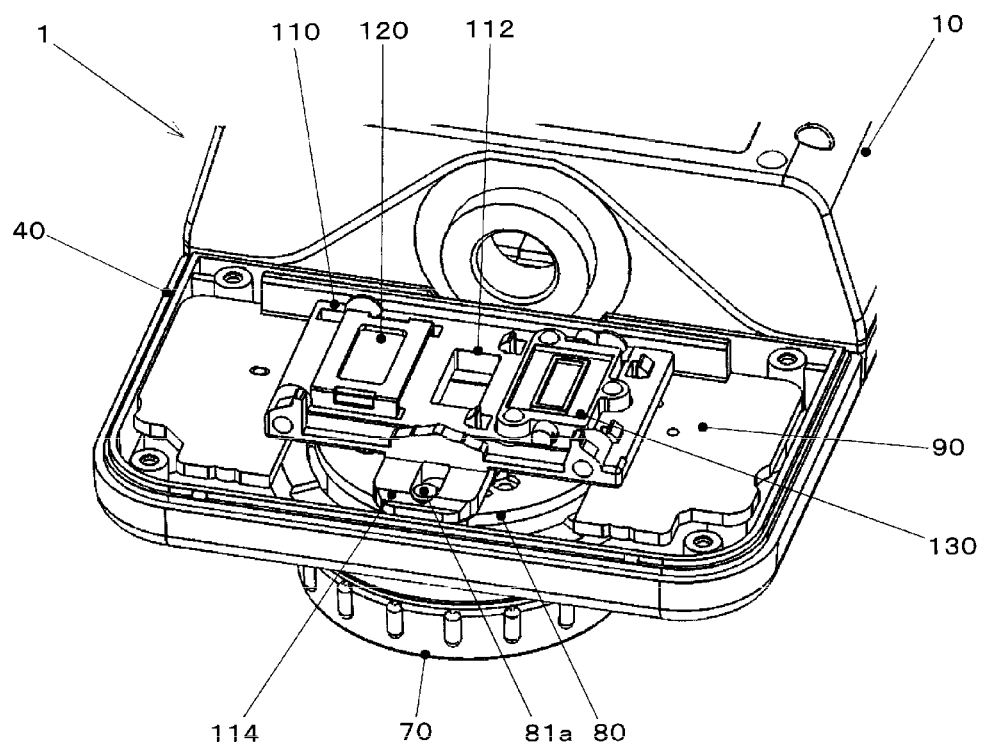
FIG. 9 is a perspective view at a peripheral of an engaging portion of a lens pressing member and an optical sliding member in a color meter of Example, and is a drawing showing an L mode state.
Figure 10:
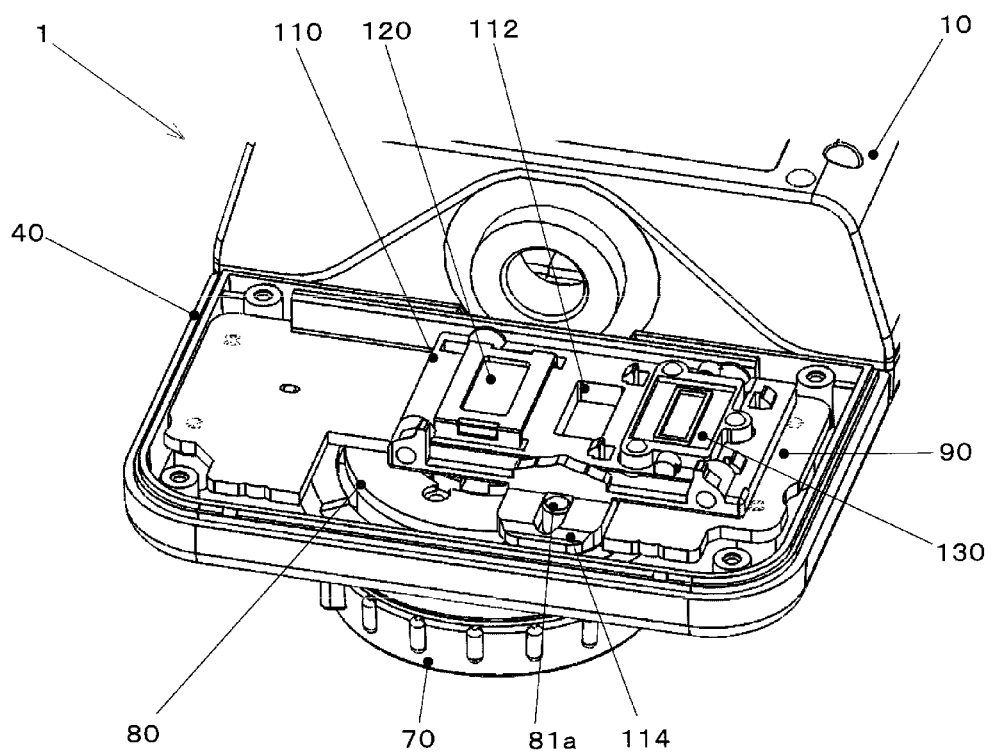
FIG. 10 is a perspective view at a peripheral of an engaging portion of a lens pressing member and an optical sliding member in a color meter of Example, and is a drawing showing an H mode state.
Figure 11:
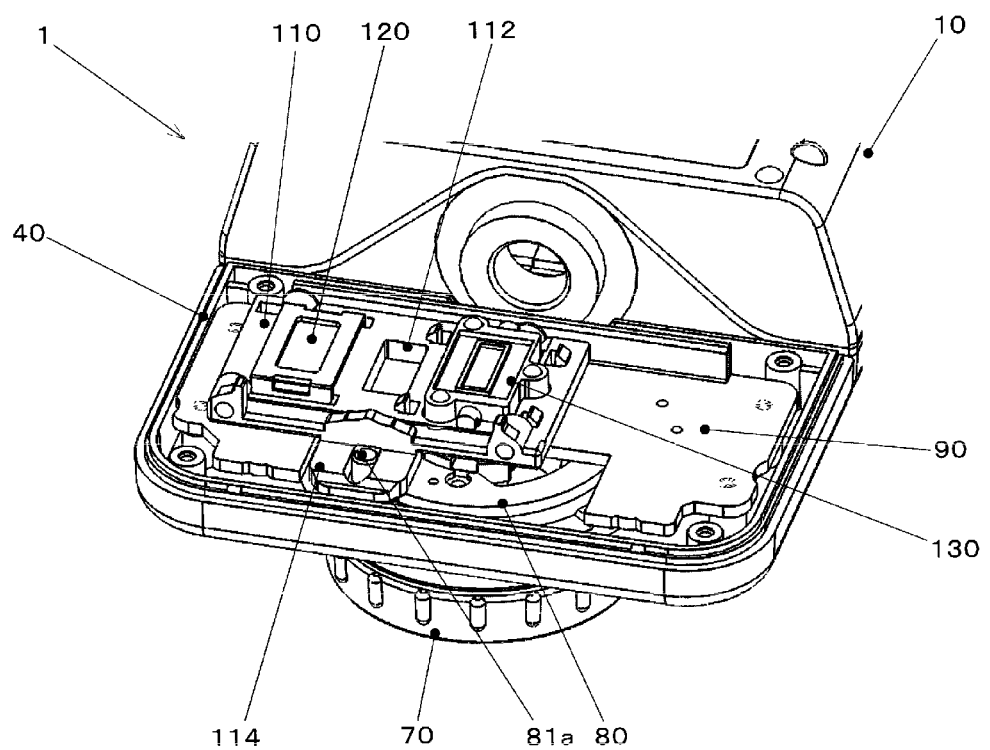
FIG. 11 is a perspective view at a peripheral of an engaging portion of a lens pressing member and an optical sliding member in a color meter of Example, and is a drawing showing a D mode state.

FIG. 9 to FIG. 11 are perspective views at a peripheral of an engaging portion of a lens pressing member and an optical sliding member in a color meter of Example, and are drawings showing an L mode state, an H mode state and a D mode state, respectively.

In FIG. 9 to FIG. 11, a sensor housing portion 20, a spectroscopic sensor 30, a fixed light shielding member 140, a collimating lens 150, etc., are omitted from the drawings.

The engaging portion 81 and the engaged portion 114 cooperate to convert rotational movement of a cam case 60, an operating member 70 and a lens pressing member 80 to linear movement to the slide direction.

In the L mode state shown in FIG. 9, an opening 112 is provided on the optical axis (on the center axis of the fiber rod 100), and the light emitted from the fiber rod 100 through the IR cut-off filter 92 and the heat absorption filter 93 is substantially directly entered into the collimating lens 150.

Transition from the L mode state shown in FIG. 9 to the H mode state shown in FIG. 10 is carried out by rotating the operating member 70, the cam case 60 and the lens pressing member 80 counter clockwise in FIG. 10, and sliding the optical sliding member 110 to the right side cooperating therewith.

At this time, an ND filter 120 is provided on the optical axis, and the emitted light from the fiber rod 100 through the IR cut-off filter 92 and the heat absorption filter 93 is incident to a collimating lens 150 in the state where the light quantity is reduced.

Transition from the L mode state shown in FIG. 9 to the D mode state shown in FIG. 11 is carried out by rotating the operating member 70, the cam case 60 and the lens pressing member 80 clockwise in FIG. 11, and sliding the optical sliding member 110 to the left side cooperating therewith.

At this time, a movable light shielding member 130 is provided on the optical axis, and the spectroscopic sensor 30 is in a substantially shielded dark state.

The ND filter 120 is an optical element which reduces the passing light with a predetermined light quantity without changing wavelength characteristics, color temperature, etc.

The ND filter 120 is attached to the ND filter fitting portion 111 of the optical sliding member 110.

The movable light shielding member 130 is a member which substantially shields incident light to the collimating lens 150 by cooperating with the fixed light shielding member 140 to make the spectroscopic sensor 30 light shielding state, when the D mode is selected.

Figure 12:
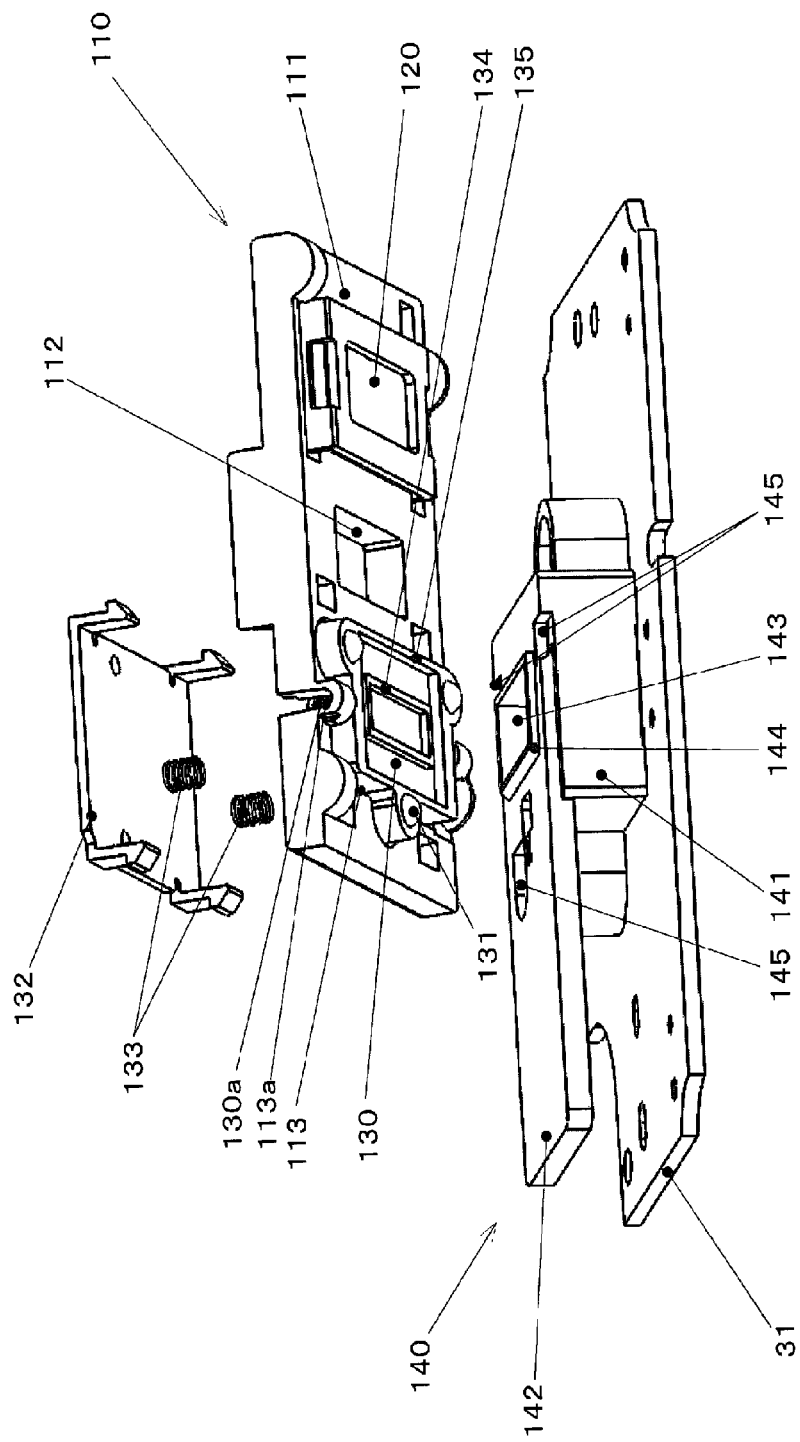
FIG. 12 is an exploded perspective view of a movable light shielding member and a fixed light shielding member in a color meter of Example.

FIG. 12 is an exploded perspective view of a movable light shielding member and a fixed light shielding member in a color meter of Example.

As shown in FIG. 12, the fixed light shielding member 140 is a member in which a sensor cover portion 141, a guide face portion 142, an opening 143, a projection frame portion 144, a concave portion 145, etc., are, for example, integrally formed by an injection molding of a resin-based material.

The fixed light shielding member 140 is fixed to the face portion at the light source side of the substrate 31 to which the spectroscopic sensor 30 is to be attached.

The sensor cover portion 141 is a rectangular box shaped portion which is provided by projecting from the substrate 31 to the light source side, and is a portion into which the spectroscopic sensor 30 and the collimating lens 150 are contained.

The guide face portion 142 is a flat plate portion formed by elongating the face portion of the light source side of the sensor cover portion 141 substantially along the plane surface perpendicular to the optical axis.

The guide face portion 142 is to guide the movable light shielding member 130 so that it moves along the plane surface perpendicular to the optical axis by contacting with the steel balls 131 of the movable light shielding member 130.

The opening 143 is a through hole formed at the guide face portion 142, and is to introduce the light which is an object to be measured into the sensor cover portion 141.

The projection frame portion 144 is formed in a rectangular shape surrounding around the opening 143 in which the projection projected from the guide face portion 142 to the light source side.

The concave portion 145 is provided at around the projection frame portion 144, and formed by recessing the guide face portion 142.

The concave portion 145 is a portion in which a part of the steel balls 131 of the movable light shielding member 130 is contained when it is in the D mode state.

The movable light shielding member 130 is formed in a rectangular plate shape, as shown in FIG. 8 and FIG. 12.

The face portion which is opposed to the fixed light shielding member 140 of the movable light shielding member 130 is formed substantially in a plane surface.

The movable light shielding member 130 is inserted into the movable light shielding member attached portion 113 of the optical sliding member 110.

The movable light shielding member 130 is maintained by being inserted the pin 130a projected from the side end portion into the groove portion 113a formed at the movable light shielding member attached portion 113.

A predetermined gap is provided between an outer peripheral portion of the movable light shielding member 130 and an inner peripheral portion of the movable light shielding member attached portion 113, and the movable light shielding member 130 is allowed to relatively move in a translation direction along the optical axis direction to the optical sliding member 110, and to be relative displacement to the rotation (inclination) direction with the pin as a center axis of rotation.

The movable light shielding member 130 is constituted by having steel balls 131, a pressing member 132, a spring 133, a projected portion 134, an outer frame portion 135, etc.

The steel balls 131 are rolling elements in which the main portion is buried in the concave portion formed at the fixed light shielding member 140 side of the movable light shielding member 130.

A part of the steel balls 131 is so arranged that it is projected from the movable light shielding member 130 to the fixed light shielding member 140 side.

The steel balls 131 are provided, for example, three around the movable light shielding member 130.

At the time of the L mode or the H mode, the steel balls 131 are contacted with the guide face portion 142 of the fixed light shielding member 140, and at the time of sliding the optical sliding member 110, the steel balls 131 guide the movable light shielding member 130 while rotating in the state of contacting with the guide face portion 142.

Also, at the time of the D mode, the projected portions of the steel balls 131 are inserted into the concave portion 145 of the fixed light shielding member 140.

The pressing member 132 is attached to the light source side of the movable light shielding member attached portion 113 of the optical sliding member 110, which is to prevent from dropping the movable light shielding member 130.

The pressing member 132 is, for example, constituted by an injection molding of a resin-based material, and fixed at the optical sliding member 110 by engaging the claw part thereof having elasticity with the optical sliding member 110.

The spring 133 is a compression coil spring which is so provided that it is laid between the face portion (the face portion at the opposite side to the fixed light shielding member 140) at the light source side of the movable light shielding member 130 and the face portion of the pressing member 132 opposing thereto.

The spring 133 is to energize the movable light shielding member 130 to the optical sliding member 110 with the fixed light shielding member 140 side.

The projected portion 134 is a portion in which the movable light shielding member 130 is formed by stepwisely projected from the face portion opposing to the guide face portion 142.

A plane surface shape of the projected portion 134 viewed from the spectroscopic sensor 30 side is a rectangular shape which is larger than the opening 143 of the fixed light shielding member 140, and capable of closing the opening 143.

A projecting amount of the projected portion 134 is so formed that it is substantially equal to that of the projection frame portion 144.

An outer peripheral portion of the projected portion 134 is so constituted that it becomes a rectangular shape smaller than the inner peripheral portion of the projection frame portion 144.

The outer frame portion 135 is a rectangular frame-like projection formed by projecting from the outer peripheral portion of the movable light shielding member 130 to the fixed light shielding member 140 side.

A projecting amount of the outer frame portion 135 from the main plane surface opposing to the guide face portion 142 in the movable light shielding member 130 is so formed that it is substantially equal to that of the projected portion 134.

The outer frame portion 135 is formed in a rectangular shape capable of containing the projection frame portion 144 of the fixed light shielding member 140 at the inner circumference side thereof.

According to the above-mentioned constitution, the gap between the projected portion 134 and the outer frame portion 135 is constituted as a rectangular shape circular groove portion into which the projection frame portion 144 of the fixed light shielding member 140 is inserted and contained.

Figure 13:
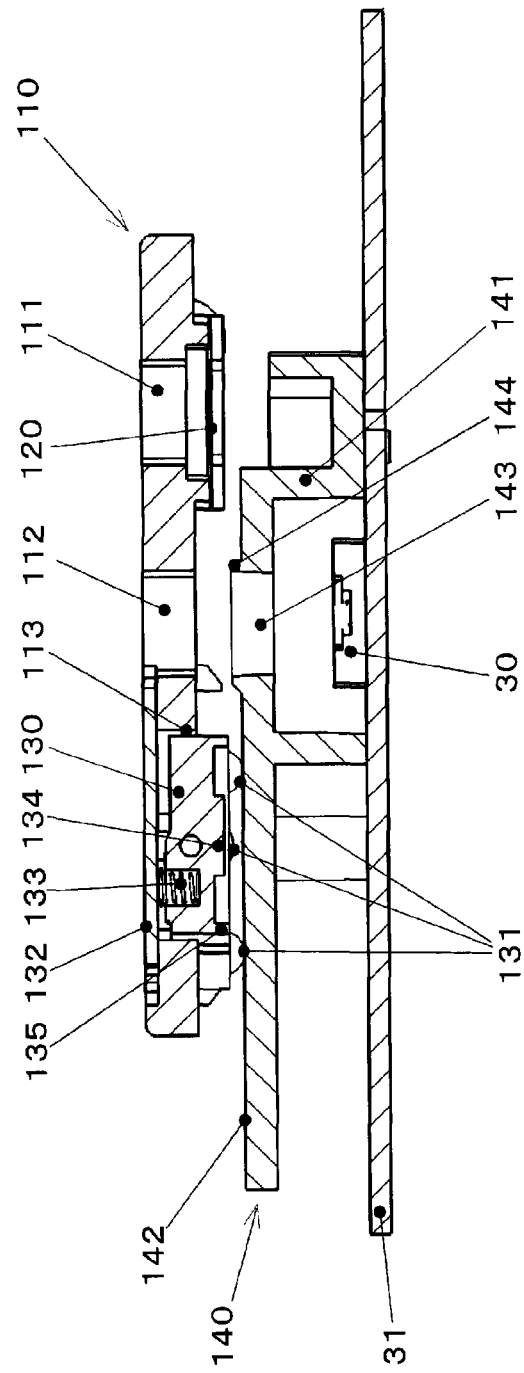
FIG. 13 is a sectional view of a movable light shielding member and a fixed light shielding member in a color meter of Example, and showing a state at an L mode.
Figure 14:
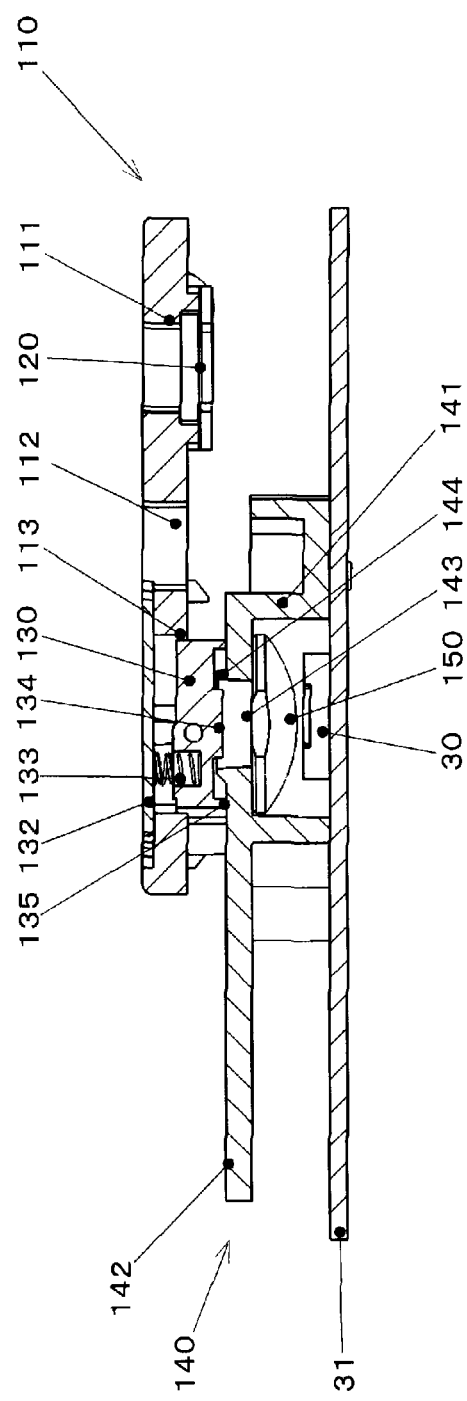
FIG. 14 is a sectional view of a movable light shielding member and a fixed light shielding member in a color meter of Example, and showing a state at a D mode.

FIG. 13 and FIG. 14 are sectional views of a movable light shielding member and a fixed light shielding member in a color meter of Example, and showing a state at an L mode and a D mode, respectively.

In the L mode shown in FIG. 13, by contacting the projecting end parts of the steel balls 131 projected from the body portion of the movable light shielding member 130 with the guide face portion 142, the movable light shielding member 130 is in the state it is displaced in the separating direction to the fixed light shielding member 140.

In this state, the projecting end face portions of the projected portion 134 and the outer frame portion 135 are disposed at the light source side than the projecting end portion of the projection frame portion 144, and the projected portion 134 and the outer frame portion 135 are relative movable along the guide face portion 142 without interfering with the projection frame portion 144.

In the D mode shown in FIG. 14, the projecting end portions of the steel balls 131 are inserted (dropped) into the concave portion 145 of the fixed light shielding member 140.

According to the above constitution, the movable light shielding member 130 is fed out from the optical sliding member 110 in an approaching direction of the fixed light shielding member 140 substantially along with the optical axis direction, according to the energizing force of the spring 133.

In this state, the projected portion 134 is inserted into inside of the projection frame portion 144 and in the state in which it substantially closes the opening 143.

The projected portion 134 of the movable light shielding member 130 is in a state inserted into inside of the projection frame portion 144 of the fixed light shielding member 140.

The projecting end portion of the projection frame portion 144 of the fixed light shielding member 140 is contacted with the face portion (the region around the projected portion 134) opposed to the movable light shielding member 130.

Also, the projection frame portion 144 of the fixed light shielding member 140 is surrounded by the outer frame portion 135 of the movable light shielding member 130.

The projecting end portion of the outer frame portion 135 is contacted with the guide face portion 142.

According to such a constitution, the gap between the movable light shielding member 130 and the fixed light shielding member 140 is formed in a labyrinth-like around the opening 143, whereby high shielding performance can be obtained.

The collimating lens 150 is an optical element which collimates the light incident from the fiber rod 100 through the IR cut-off filter 92 and the heat absorption filter 93, and after adjusting the same as substantially parallel light, and enters the same into the spectroscopic sensor 30.

The collimating lens 150 is contained and fixed in the region at the light source side than the spectroscopic sensor 30 in the sensor cover portion 141 of the fixed light shielding member 140.

The filter position detecting sensor 160 is provided at the inside of the sensor housing portion 20, and by detecting the position of the optical sliding member 110, it can judge whether which operation mode is selected at present.

As explained above, according to the present Example, by introducing the light incident from the light bulb 50 into the collimating lens 150 after mixing it in the fiber rod 100, the light can be entered into the spectroscopic sensor 30 as parallel light more certainly, whereby measurement precision can be improved.

Also, by making the length of the fiber rod 100 5-fold or more of the diameter of the same, the above-mentioned effects can be more certainly obtained.

Further, by providing the light shielding plates 32 and 33, the IR cut-off filter 92, the heat absorption filter 93, etc., measurement precision can be more heightened by suppressing various kinds of stray light.

Modified Example

The present invention is not limited to the Example explained above, and various modification and alteration are possible, which are also included in the technical scope of the present invention.

(1) The photometric apparatus of Example was a color meter (a colorimetric device and a color thermometer) as an example, but the present invention is not limited by this sample, and it is possible to apply to the other photometric apparatuses, for example, an illuminometer for measuring illuminance of light to be tested or an exposure meter, etc.

(2) It is possible to optionally modify the shape, structure, material, preparation method, etc., of the respective members which constitute the photometric apparatus without limitation by the Example.

For example, in Example, the fiber rod is formed by a plastics, but it may be formed by a glass or quartz. Also, the structure of the fiber rod may be a uniform structure or a fiber structure. Further, the shape of the fiber rod is not limited only to columnar, but may be other shapes such as quadrangular and hexagonal, etc.

EXPLANATION OF REFERENCE NUMERALS

| 1  | Color meter   |    |                  |
|----|---------------|----|------------------|
| 10 | Body portion  | 11 | Display apparatus |

-continued

| 20 | Sensor housing portion | 21 | Opening |
|---|---|---|---|
| 30 | Spectroscopic sensor | 31 | Substrate |
| 32 | Light shielding plate | 33 | Light shielding plate |
| 40 | Optical cover | 41 | Opening |
| 42 | H mode index | 43 | L mode index |
| 44 | D mode index | | |
| 50 | Light bulb | 51 | Cam follower |
| 60 | Cam case | 61 | Flange |
| 62 | Click plate | 63 | Cam groove |
| 70 | Operating member | 71 | Index |
| 80 | Lens pressing member | 81 | Engaging portion |
| 81a | Engagement pin | | |
| 90 | Filter fixing member | 91 | Fiber rod holding portion |
| 92 | IR cut-off filter | 93 | Heat absorption filter |
| 100 | Fiber rod | | |
| 110 | Optical sliding member | 111 | ND filter fitting portion |
| 112 | Opening | | |
| 113 | Movable light shielding member attached portion | | |
| 113a | Groove portion | 114 | Engaged portion |
| 120 | ND filter | | |
| 130 | Movable light shielding member | 130a | Pin |
| 131 | Steel ball | 132 | Pressing member |
| 133 | Spring | 134 | Projected portion |
| 135 | Outer frame portion | | |
| 140 | Fixed light shielding member | 141 | Sensor cover portion |
| 142 | Guide face portion | 143 | Opening |
| 144 | Projection frame portion | | |
| 150 | Collimating lens | | |
| 160 | Filter position detecting sensor | | |

The invention claimed is:

1. A photometric apparatus comprising:
a photometric sensor into which light which is an object to be measured is incident;
a signal processor configured to process a sensor output by the photometric sensor; and
an optical system which introduces external light into the photometric sensor, a columnar fiber rod in which a center axis is provided along a direction perpendicular to a light receiving surface of the photometric sensor is provided at a part of the optical system, at least one of an infrared (IR) cut-off filter and a heat absorption filter is provided to at least one of an incident side and an emitting side of the fiber rod,
wherein a length of the fiber rod is made 5 fold or more with respect to that of a diameter or the distance between two opposite sides of the fiber rod.

2. The photometric apparatus according to claim 1, wherein the apparatus is provided by
a diffusion board which diffuses external light incident into the fiber rod, and
a collimating optical element which makes light emitted from the fiber rod substantially parallel light.

3. The photometric apparatus according to claim 1, wherein
a diaphragm plate which cuts off stray light is provided between the collimating optical element and the photometric sensor.

4. A photometric apparatus comprising:
a photometric sensor into which light which is an object to be measured is incident;
a signal processor configured to process a sensor output by the photometric sensor;
an optical system which introduces external light into the photometric sensor, a columnar fiber rod in which a center axis is provided along a direction perpendicular to a light receiving surface of the photometric sensor is provided at a part of the optical system;
a diffusion board which diffuses external light incident into the fiber rod; and
a collimating optical element which makes light emitted from the fiber rod substantially parallel light,
wherein at least one of an infrared (IR) cut-off filter and a heat absorption filter is provided to at least one of an incident side and an emitting side of the fiber rod.

5. A photometric apparatus comprising:
a photometric sensor into which light which is an object to be measured is incident;
a signal processor configured to process a sensor output by the photometric sensor;
an optical system which introduces external light into the photometric sensor, a columnar fiber rod in which a center axis is provided along a direction perpendicular to a light receiving surface of the photometric sensor is provided at a part of the optical system;
a diffusion board which diffuses external light incident into the fiber rod; and
a collimating optical element which makes light emitted from the fiber rod substantially parallel light,
wherein a diaphragm plate which cuts off stray light is provided between the collimating optical element and the photometric sensor, and
wherein at least one of an infrared (IR) cut-off filter and a heat absorption filter is provided to at least one of an incident side and an emitting side of the fiber rod.

6. A photometric apparatus comprising:
a photometric sensor into which light which is an object to be measured is incident;
a signal processor configured to process a sensor output by the photometric sensor;
an optical system which introduces external light into the photometric sensor, a columnar fiber rod in which a center axis is provided along a direction perpendicular to a light receiving surface of the photometric sensor is provided at a part of the optical system;
a diffusion board which diffuses external light incident into the fiber rod; and
a collimating optical element which makes light emitted from the fiber rod substantially parallel light,
wherein a length of the fiber rod is made 5 fold or more with respect to that of a diameter or the distance between two opposite sides, and
wherein at least one of an infrared (IR) cut-off filter and a heat absorption filter is provided to at least one of an incident side and an emitting side of the fiber rod.

* * * * *